(12) United States Patent
Hecht

(10) Patent No.: US 8,573,900 B1
(45) Date of Patent: Nov. 5, 2013

(54) CUTTING TOOL AND CUTTING TOOL HOLDER HAVING LEVER PIN

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 13/450,691

(22) Filed: Apr. 19, 2012

(51) Int. Cl.
*B23B 27/16* (2006.01)
*B23C 5/20* (2006.01)

(52) U.S. Cl.
USPC ............................................ 407/105; 407/103

(58) Field of Classification Search
USPC .......................... 407/102, 103, 104, 105, 107
See application file for complete search history.

(56) References Cited

U.S. PATENT DOCUMENTS

| | | | | |
|---|---|---|---|---|
| 3,469,296 | A * | 9/1969 | Reeve et al. | 407/105 |
| 3,491,421 | A * | 1/1970 | Holloway | 407/105 |
| 3,997,951 | A * | 12/1976 | Williscraft | 407/105 |
| 4,166,711 | A * | 9/1979 | Kress et al. | 408/233 |
| 4,615,650 | A | 10/1986 | Hunt | |
| 6,158,928 | A * | 12/2000 | Hecht | 407/102 |
| 6,582,162 | B2 | 6/2003 | Shiraiwa | |
| 6,599,060 | B2 * | 7/2003 | Hecht | 407/102 |
| 7,431,539 | B2 * | 10/2008 | Erickson et al. | 407/104 |

FOREIGN PATENT DOCUMENTS

| | | |
|---|---|---|
| EP | 0 450 542 | 10/1991 |
| EP | 0559965 A1 | 9/1993 |
| JP | S49 50576 A | 5/1974 |
| JP | 2000-000702 A | 1/2000 |
| WO | WO 2013/081065 A1 | 6/2013 |

OTHER PUBLICATIONS

International Search Report dated Jul. 26, 2013 issued in PCT counterpart application (No. PCT/IL2013/050256).

* cited by examiner

*Primary Examiner* — Will Fridie, Jr.
(74) *Attorney, Agent, or Firm* — Womble Carlyle

(57) ABSTRACT

A tool holder includes an insert pocket having a support surface with a pocket recess occupied by a lever pin, and a fastening member. A head portion of the lever pin has a lever head rear contact surface, located above the support surface, for pressing against a bore of a cutting insert in the insert pocket. The fastening member engages a threaded recess which extends from the pocket recess along a threaded recess axis. The fastening member includes a guiding prong, located within a blind hole in the front of the lever pin. A clamping contact surface of the fastening member is adjacent to a lever front contact surface of the lever pin. A first longitudinal distance, between the lever rear contact surface and the lever front contact surface, is smaller than a second longitudinal distance, between the lever front contact surface and a lever rear contact surface.

18 Claims, 4 Drawing Sheets

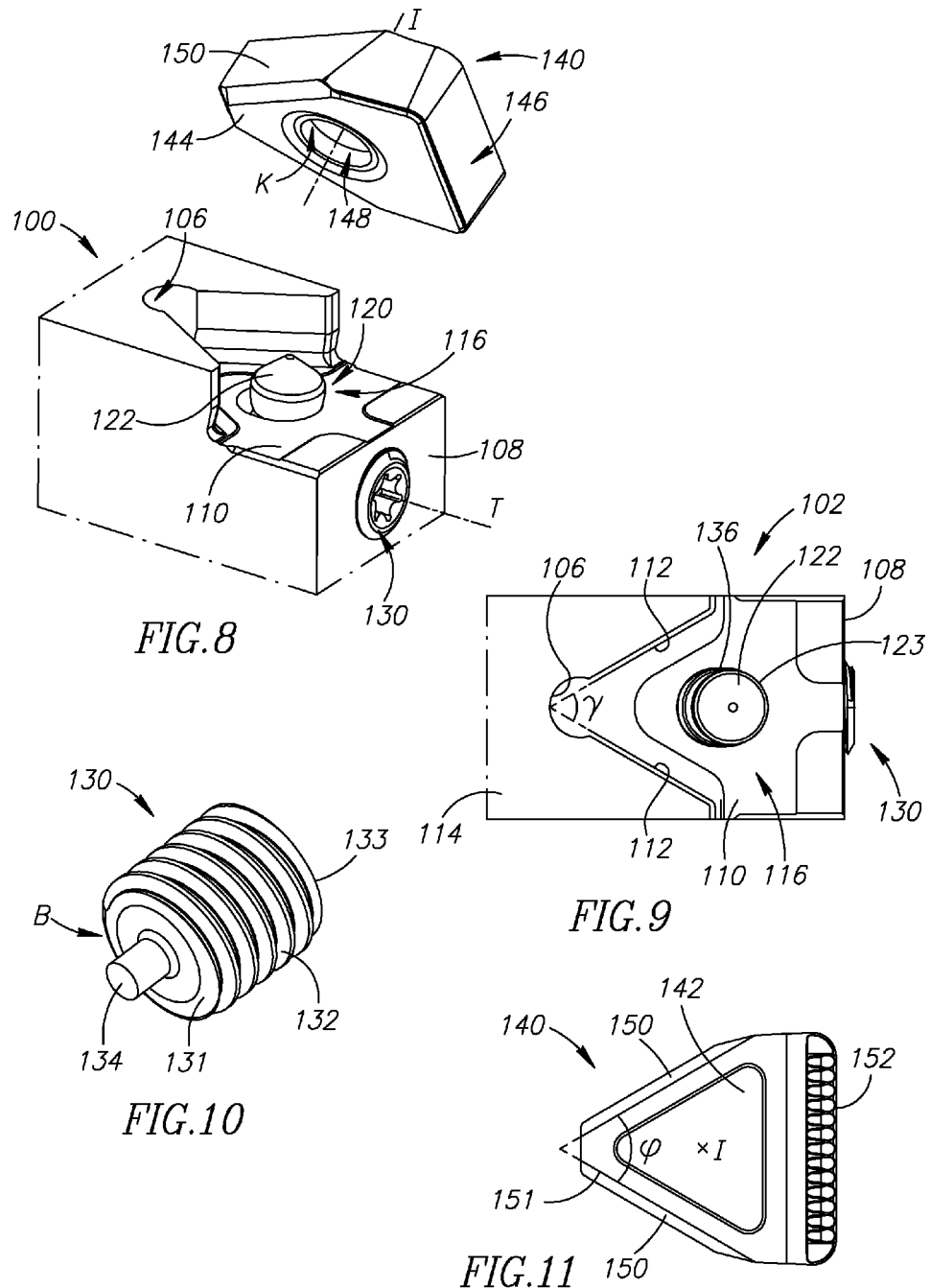

US 8,573,900 B1

CUTTING TOOL AND CUTTING TOOL HOLDER HAVING LEVER PIN

FIELD OF THE INVENTION

The present invention relates to metal cutting tools and holders for cutting inserts, for metal cutting processes in general, and to a tool holder for cutting inserts for turning operations, in particular.

BACKGROUND OF THE INVENTION

Metal cutting tools used in turning operations, including cutting inserts which are removably secured in a holder, have long since provided a suitably hard material, i.e. cemented carbide, in the vicinity of the cutting edge, where the cutting tool holder, manufactured from a less hard material, is reusable following the disposal of a worn or damaged cutting insert.

Cutting inserts are clamped within insert receiving pockets located on the front of the tool holder, for holding and supporting cutting inserts during operation (e.g., turning operation). Holders for cutting inserts may have a clamping member contacting a hole in the cutting insert thereby fastening the cutting insert in the insert pocket. The holders may further have a screw member for exerting pressure on the clamping member to contact the cutting insert. Examples of such tool holders for cutting inserts are disclosed in the following publications: U.S. Pat. No. 3,469,296, U.S. Pat. No. 3,997,951, U.S. Pat. No. 4,166,711, U.S. Pat. No. 4,615,650, U.S. Pat. No. 6,158,928, U.S. Pat. No. 6,582,162 and EPO450542A1.

It is an object of the subject matter of the present application to provide an improved novel tool holder for cutting insert having a lever pin and a front fastening member, and a cutting tool employing such a tool holder, in particular for cutting inserts with a blind bore therein. The novel tool holder provides better clamping leverage applied on the cutting insert, as well as a dovetail abutment against the insert pocket of the tool holder.

SUMMARY OF THE INVENTION

In accordance with the subject matter of the present application, there is provided a tool holder comprising:
  an insert pocket comprising:
    an insert pocket support surface extending from an insert pocket rear portion, in a forward direction, towards an insert pocket front surface;
    at least one support wall extending from the insert pocket support surface to an insert pocket top surface, in an upward direction;
    a pocket recess opening out to, and extending downwards from, the insert pocket support surface; and
    a threaded recess opening out to the insert pocket front surface and to the pocket recess, the threaded recess having a threaded recess axis;
  a lever pin having a top end, a bottom end and a lever pin longitudinal axis, located within the pocket recess, the lever pin comprising:
    a head portion, having thereon a lever head rear contact surface, located above the insert pocket support surface;
    a lever front surface, extending downwards from the head portion, at least a portion of the lever front surface sloping in a slope angle relative to the lever pin longitudinal axis, the lever front surface having thereon a lever front contact surface, located downwards from the lever head rear contact surface by a first longitudinal distance;
    a blind hole opening out to, and extending from, the lever front surface towards the lever pin longitudinal axis, the blind hole located along the threaded recess axis; and
    a base portion provided with a rocker pivot portion to enable tilting of the lever pin about the rocker pivot portion, in the forward-rearward directions; and
    a lever rear contact surface, located downwards from the lever front contact surface by a second longitudinal distance; and
  a fastening member comprising a first end having thereon a clamping contact surface, a second end, a threading surface extending between the first and second ends, and a guiding prong extending from the first end generally perpendicular to the first end, the threading surface engaging the threaded recess and locating the guiding prong within the blind hole and the clamping contact surface adjacent to the lever front contact surface;
  wherein in a side view of the lever pin, the first longitudinal distance is smaller than the second longitudinal distance.

In accordance with another embodiment of the subject matter of the present application, there is provided a cutting tool comprising the tool holder according to the above, and a cutting insert, located in the insert pocket of the tool holder. The cutting insert includes a first surface, a second surface, a peripheral surface extending there between, and an insert bore opening out to at least the second surface. The insert bore has a longitudinal central bore axis perpendicular to the first and second surfaces. The peripheral surface has at least one side abutment surface forming an insert dovetail angle with the second surface.

BRIEF DESCRIPTION OF THE FIGURES

For a better understanding of the present application and to show how the same may be carried out in practice, reference will now be made to the accompanying drawings, in which:

FIG. 8 is a perspective view of the cutting tool of FIG. 1, with the cutting insert detached from the tool holder;

FIG. 9 is a top view of the tool holder of the cutting tool of FIG. 8;

FIG. 10 is a perspective view of the fastening member of the tool holder of FIG. 1; and FIG. 11 is a top view of the cutting insert of the cutting tool of FIG. 1.

Figures 1, 2:
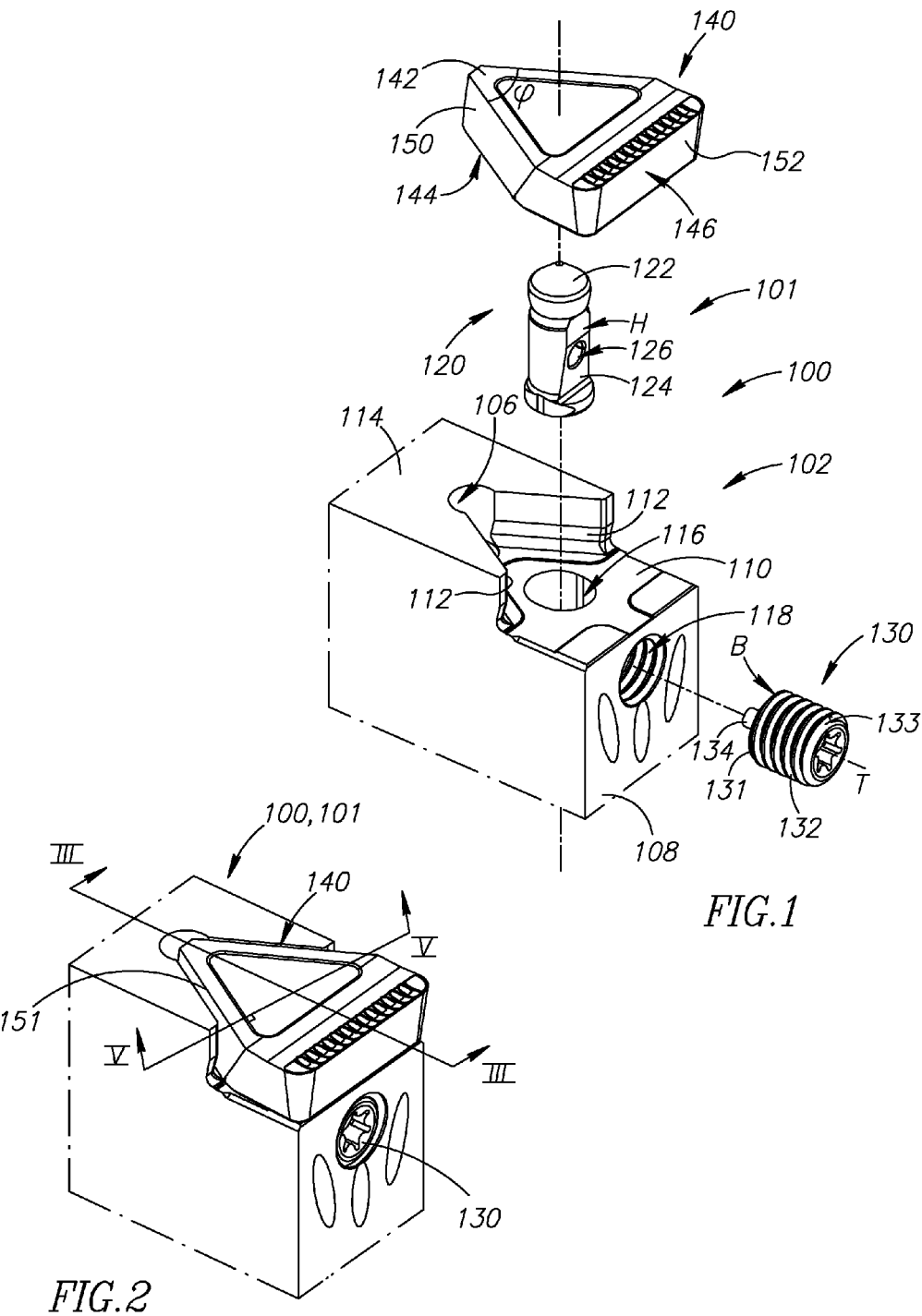
FIG. 1 is a perspective exploded view of a cutting tool in accordance with one embodiment of the disclosed technique.
FIG. 2 is a perspective view of the cutting tool of FIG. 1, in an assembled position.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the present invention. However, it will also be apparent to one skilled in the art that the subject matter of the present invention can be practiced without the specific configurations and details presented herein.

The present invention relates to a tool holder, having a lever pin and a front fastening member, in particular for holding cutting inserts with a blind bore at the bottom surface thereof. The invention also relates to a cutting tool including such a tool holder and a cutting insert with a hole opening out to the bottom surface thereof, for machining a work piece, for example in turning operations.

Attention is drawn to FIGS. 1-11, depicting various views of the cutting tool and the tool holder, according to an embodiment of the present invention. FIG. 1 depicts an exploded perspective view of a cutting tool 101, including a tool holder 100 and a cutting insert 140. The tool holder 100 comprises an insert pocket 102, a lever pin 120 and a fastening member 130. The insert pocket 102 includes an insert pocket rear portion 106 and an insert pocket front surface 108.

Figure 3:
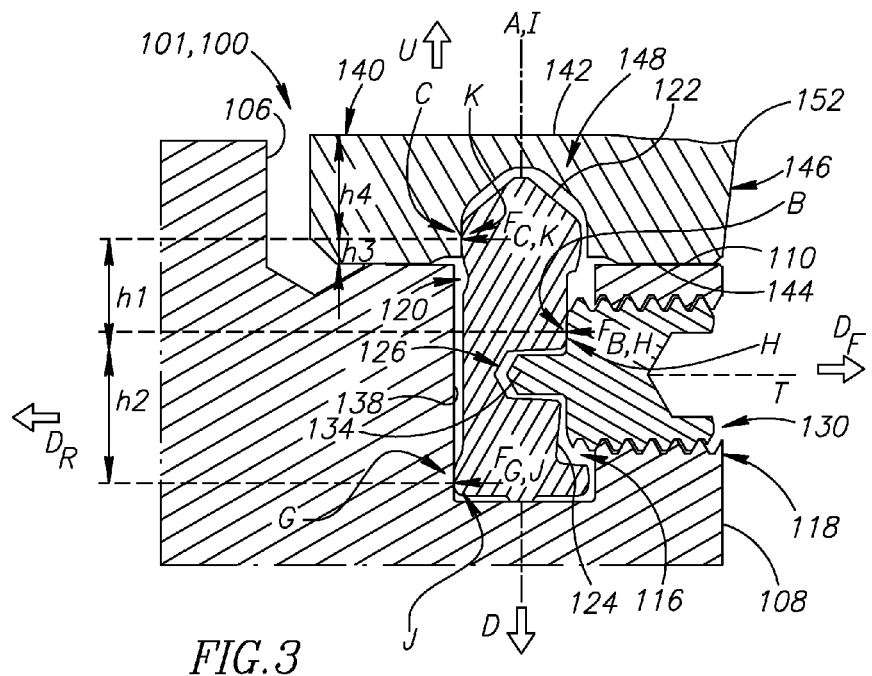
FIG. 3 is a cross section view of the cutting tool of FIG. 2, in an assembled position, as per cutting line III-III.

An insert pocket support surface 110 extends from the insert pocket rear end 106 towards the insert pocket front surface 108, in a forward direction $D_F$ (indicated in FIG. 3). According to some embodiments, the insert pocket front surface 108 is perpendicular to the insert pocket support surface 110.

Figure 5:
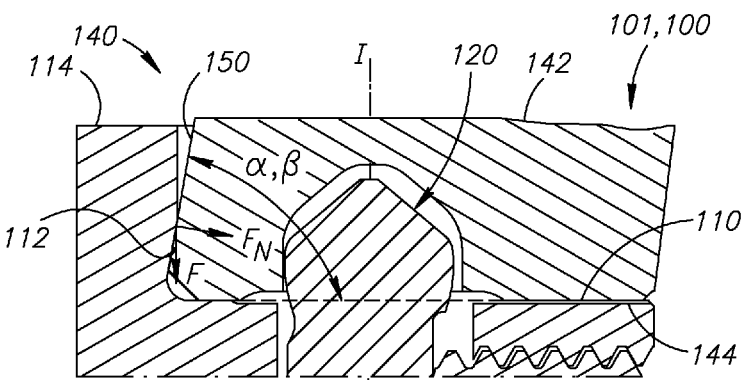
FIG. 5 is a cross section view of the cutting tool of FIG. 2, in an assembled position, as per cutting line V-V.

At least one support wall 112 extends from the insert pocket support surface 110 to an insert pocket top surface 114, in an upward direction U. As best shown in FIG. 5, at least a portion of the support wall 112 forms a pocket dovetail angle β with the insert pocket support surface 110. According to an embodiment of the disclosed technique, the insert pocket 102 includes two support walls 112, converging rearwards in a support wall rearward convergence angle γ, when viewed perpendicular to the support surface 110 (FIG. 9).

A pocket recess 116 opens out to the insert pocket support surface 110, and extends downwards from the insert pocket support surface 110 towards a recess floor 117 of the pocket recess 116. According to an embodiment of the present invention, the pocket recess 116 extends perpendicular to the insert pocket support surface 110 and parallel to the insert pocket front surface 108.

A threaded recess 118 opens out to the insert pocket front surface 108 and to the pocket recess 116, between the recess floor 117 and the support surface 110. The threaded recess 118 has a threaded recess axis T. According to some embodiments, as depicted in the present drawings in a non-binding manner, the threaded recess axis T is perpendicular to the insert pocket front surface 108. Alternatively, the threaded recess axis T may be angled relative to the insert pocket front surface 108.

The lever pin 120 is located within the pocket recess 116. The lever pin 120 has a top end 125a and a bottom end 125b and extends along a central lever pin longitudinal axis A. At its top end 125a, the lever pin 120 includes a tapering head portion 122, having a rearward-facing lever head rear contact surface C. The lever head rear contact surface C is located above the insert pocket support surface 110.

A forward-facing lever front surface 124 extends from the head portion 122 downwards and towards the lever pin longitudinal axis A. At least a portion of the lever front surface 124 slopes in the direction of the bottom end 125b at a slope angle δ relative to the lever pin longitudinal axis A. The lever front surface 124 has a lever front contact surface H, located downwards from the lever head rear contact surface C, by a first longitudinal distance h1. A blind hole 126 opens out to, and extends from, the lever front surface 124, towards and generally perpendicular to the lever pin longitudinal axis A. When the lever pin 120 is located within the pocket recess 116, the blind hole 126 lies along the threaded recess axis T. The blind hole 126 is preferably non-threaded so that it can freely receive a guiding prong 134 of a fastening member 130, as described further below.

At its bottom end 125b, the lever pin 120 includes an enlarged base portion 121. Due to the downward sloping of the lever front surface 124 towards the lever pin longitudinal axis A, the base portion 121 may comprise a base recess 127 which faces the same direction as the lever front surface 124 and is closer to the lever pin longitudinal axis A than the lever front contact surface H.

The lever pin 120 also includes a rocker pivot portion 128, enabling tilting motion of the lever pin 120 in a direction transverse to the lever front surface 124, and thus in the forward-rearward directions $D_F$, $D_R$, about the rocker pivot portion 128, against the pocket recess floor 117. Further, the lever pin 120 also includes a rearward-facing lever lower rear contact surface G, located downwards from the lever front contact surface H, by a second longitudinal distance h2. The lever lower rear contact surface G may be located formed on the base portion 121 opposite the base recess 127. The rocket pivot portion 128 may be, for example, in the form of a rounded protrusion extending downwardly from the base portion 121 of the lever pin 120, or in the form of a rounded bottom of the lever pin 120, facilitating a pivot mechanism against the pocket recess floor 117.

The fastening member 130 is further shown in a detailed perspective in FIG. 10. The fastening member 130 has a generally cylindrical shape, and includes a first end 131, a second end 133, a threading surface 132, and a guiding prong 134. The threading surface 132 extends between the first and second ends 131, 133. The first end 131 has thereon a clamping contact surface B. The guiding prong 134 extends from the first end 131, perpendicular to the first end 131. The fastening member is located within the threaded recess 118, such that the threading surface 132 engages the threaded recess 118. In this position, the guiding prong 134 is received within the blind hole 126 of the lever pin 120, and the clamping contact surface B is adjacent to the lever front contact surface H. The fastening member 130 may be engaged into the threaded recess 118 by an appropriate screw driver or key through the second end 133.

With reference to FIG. 8, in which a perspective view is depicted of the cutting tool of FIG. 1, with the cutting insert 140 released and separated from the tool holder 100. In this view, the cutting insert 140 is shown from an upwards perspective. The cutting insert 140 includes a first surface 142, a second surface 144, a peripheral surface 146 and an insert bore 148. The peripheral surface 146 extends between the first and second surfaces 142, 144. The insert bore 148 has a longitudinal central bore axis I perpendicular to the first and second surfaces 142, 144. The insert bore 148 has an insert bore rear contact surface K on the rearward wall thereof (not shown). The insert bore 148 is a blind bore that opens out at least to the second surface 144. However, according to some embodiments of the disclosed technique, the insert bore 148 may be a through bore that opens out to both the first and second surfaces 142, 144.

The peripheral surface 146 includes at least one side abutment surface 150, for abutting a support wall 112 of the insert pocket 102. The view shown in FIG. 5 is taken perpendicular to the first surface 142 and perpendicular to the intersection line 151 between the first surface 142 and the side abutment surface 150. This view depicts that the side abutment surface 150 forms an insert dovetail angle α with the second surface 144. In a preferred embodiment of the disclosed technique, the insert dovetail angle α conforms to the pocket dovetail angle β. The cutting insert 140 also includes a cutting edge 152, formed at a portion of the intersection between the first surface 142 and the peripheral surface 146. According to some embodiments of the disclosed technique, the cutting insert 140 includes two side abutment surfaces 150, converging rearwards in an insert rearward convergence angle φ, viewed perpendicular to the first surface 142 (FIG. 11). The insert rearward convergence angle φ conforms to the support wall rearward convergence angle γ.

The cutting tool 101 can be moved between a released position and a fastened position. In the released position, the cutting insert 140 may be either loosely located in the insert pocket 102 of the tool holder 100 (FIG. 4), or removed completely there from (FIG. 8). In the fastened position (FIGS. 2 and 3), the cutting insert 140 is clamped in the insert pocket 102, due to the clamping contact of the lever pin 120, as herein after elaborated.

During assembly of the cutting tool 101, the cutting insert 140 is placed in the insert pocket 102, such that the insert bore 148 receives the tapering head portion 122 of the lever pin 120. As best shown in FIG. 8, prior to installation, the tapering head portion 122 is located above the insert pocket support surface 110, and the lever pin 120 may tilt towards the insert pocket front surface 108. This allows for the insert bore 148 to be placed over the tapering head portion 122, and enable the cutting insert 140 to fit into place in the insert pocket 102. During assembly of the cutting insert 140, the insert bore rear contact surface K may slide along the rear side of the tapering head portion 122 of the lever pin 120 in the downward and rearward directions D, $D_R$, until the cutting insert 140 is placed on the insert pocket 102. Thus, the cutting insert 140 may easily slide into place when the lever pin 120 is located in various tilt positions, due to the tapering shape of the tapering head portion 122.

With further reference to FIG. 3, the pocket recess 116 has a pocket recess contact surface J on a rear wall 138 thereof. When the cutting tool 101 is in the fastened position, the second surface 144 of the cutting insert 140 abuts the insert pocket support surface 110. The fastening member 130 is threaded through the threaded recess 118 in the rearward direction $D_R$, until the clamping contact surface B presses against the lever front contact surface H. Thus, the fastening member 130 applies a first lateral rearward force $F_{B,H}$ on the lever pin 120 at the lever front contact surface H.

It is noted that due to the lever front surface 124, the contact area between the lever pin 120 and the fastening member 130 is minimized. Further, since at least a portion of the lever front surface 124 slopes at the slope angle α towards the lever pin longitudinal axis A, contact is avoided between the lever front surface 124 and the contact surface B, at locations other than at the lever front contact surface H.

The head portion 122 of the lever pin 120 is received within the insert bore 148, such that the lever head rear contact surface C presses against the insert bore contact surface K.

Thus, the lever pin 120 applies a second lateral rearward force $F_{C,K}$ on the cutting insert 140 at the insert bore contact surface K. In the fastened position, the lever pin longitudinal axis A substantially coincides with the longitudinal central bore axis I.

Further, the lever lower rear contact surface G presses against the pocket recess contact surface J. Thus, the lever pin 120 applies a third lateral rearward force $F_{G,J}$ on the pocket recess 116 at the pocket recess contact surface J. It should be noted, that the lever pin 120 is pressed at a single surface in the front side thereof (i.e., front contact surface H), and at two surfaces in the rear side thereof (i.e., head rear contact surface C and lower rear contact surface G). Therefore, a fulcrum-lever configuration is formed on lever pin 120.

When the second lateral rearward force $F_{C,K}$ is applied on the cutting insert 140, each side abutment surface 150 is pressed against a respective support wall 112, in a dovetail manner. Since the insert dovetail angle α conforms to the pocket dovetail angle β, a firm abutment is achieved between the cutting insert 140 and the insert pocket 102.

Upon fastening of the cutting insert 140, a normal force $F_N$ is applied perpendicular to each side abutment surface 150, by the respective support wall 112. As best shown in FIG. 5, due to the insert dovetail angle α and the pocket dovetail angle β, the normal force $F_N$ has a downward force component F, pressing down on the cutting insert 140, thereby keeping the cutting insert 140 abut against the insert pocket support surface 110. According to the geometrical arrangement of the cutting insert 140, the downward force component F is of the following magnitude: $F = F_N \cos \alpha$.

In accordance with the present invention, viewed perpendicular to the lever pin axis A, as best shown in FIG. 3, the first longitudinal distance h1, between the lever head rear contact surface C and the lever front contact surface H, is smaller than the second longitudinal distance h2, between the lever front contact surface H and the lever lower rear contact surface G. The fulcrum-lever configuration on lever pin 120 yields the following relation between the second and third lateral rearward forces $F_{C,K}$, $F_{G,J}$, and the first and second longitudinal distances h1, h2:

$$\frac{F_{C,K}}{F_{G,J}} \sim \frac{h2}{h1}.$$

Thus, if the first longitudinal distance h1 is smaller than the second longitudinal distance h2, the second lateral rearward force $F_{C,K}$ is greater than the third lateral rearward force $F_{G,J}$. It should be noted, that it is desirable that the lever pin 120 would transfer as much as possible of the first lateral rearward force $F_{B,H}$, to the cutting insert 140, in order to strengthen the fastening of the cutting insert 140 against the support walls 112 during operation of the cutting tool 101.

It is noted, that in the fastened position (and thus during operation), the cutting insert 140 makes no contact with the insert pocket rear portion 106. Avoiding contact between the insert pocket rear portion 106 and the cutting insert 140 is required in order to avoid undesired direct pressure on the cutting insert in a direction perpendicular to the cutting edge 152. Such undesired pressure may induce breakage and accelerated damage to the cutting edge 152, and is therefore to be avoided.

In accordance with the present invention, in a view of the cutting insert 140, perpendicular to the central bore axis I, a third longitudinal distance h3, between the insert bore rear contact surface K and the second surface 144, is smaller than a fourth longitudinal distance h4, between the insert bore rear contact surface K and the first surface 142. It is desirable to apply the second lateral rearward force $F_{C,K}$ as adjacent as possible to the second surface 144, in order to prevent an upward torque from acting on the cutting insert 140 during operation.

When the cutting insert 140 is to be removed from the tool holder 100, for example when the cutting edge 152 has worn out, and the cutting insert 140 is to be replaced, the cutting tool 101 is moved from the fastened position to the released position. Particular reference is made to FIGS. 4 and 6-9, depicting various views of the released position of cutting tool 101.

The fastening member 130 is moved in the forward direction $D_F$ through the threaded recess 118, such that the guiding prong 134 is still partially located within the blind hole 126, however the clamping contact surface B no longer contacts the lever front contact surface H. The lever pin 120 is thereby free to tilt in the forward-rearward direction $D_F$, $D_R$ about the rocker pivot portion 128, within the pocket recess 116. Further, the lever head rear contact surface C no longer presses against the insert bore rear contact surface K.

Thus, the cutting insert 140 is free to move in the forward direction $D_F$ along the support surface 110. The cutting insert 140 may move forward until the insert bore rear contact surface K is halted by the lever head rear contact surface C. In the released position, the side abutment surfaces 150 are sufficiently forwardly displaced from the support walls 112, such that the cutting insert 140 may be moved in the upward direction U until being removed completely from the tool holder 100. During removal of the cutting insert 140, the insert bore rear contact surface K may slide along the tapering head portion 122 of the lever pin 120 in the upward and forward directions U, $D_F$, until the cutting insert 140 is removed from the tool holder 100.

Figure 6:
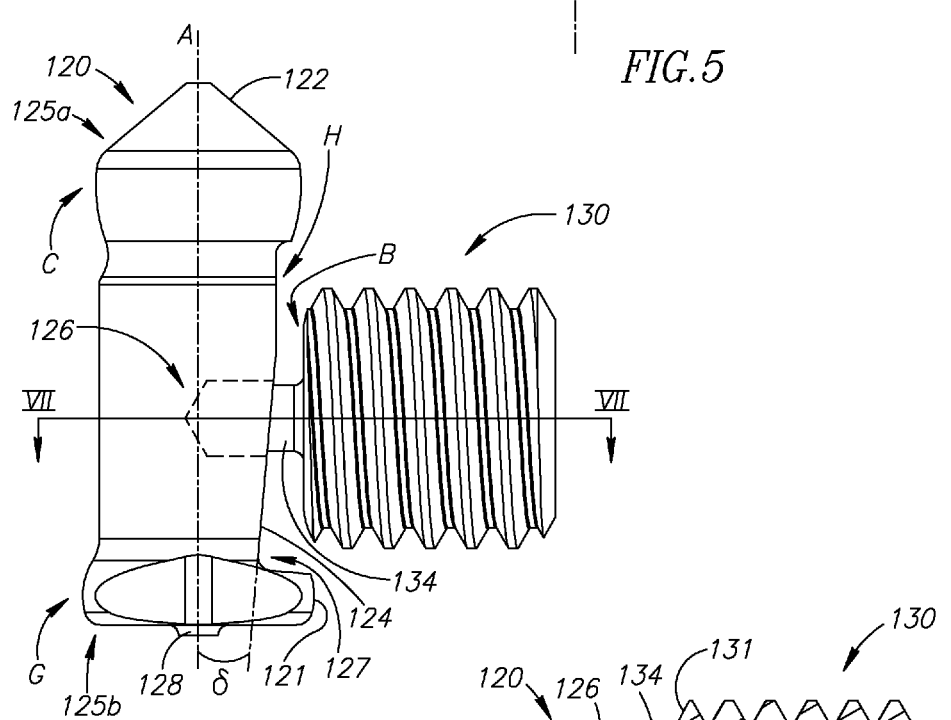
FIG. 6 is a side view of the lever pin and the fastening member of the tool holder of the cutting tool of FIG. 1.
Figure 7:
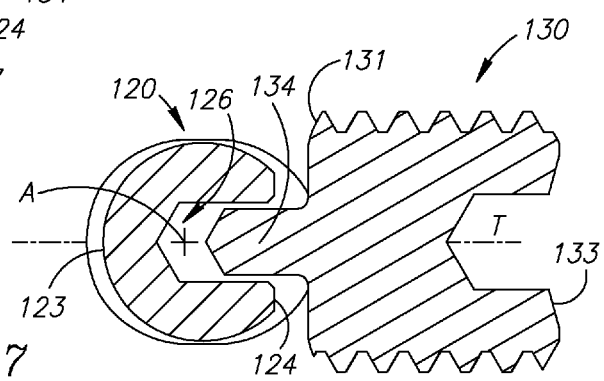
FIG. 7 is a cross section view of the lever pin and the fastening member shown in FIG. 6, as per cutting line VII-VII.

With further reference to FIGS. 6 and 7, in the released position, the guiding prong 134 is partially located within the blind hole 126 of the lever pin 120. Thus, the lever pin 120 is prevented from rotating about the lever pin longitudinal axis A, and from moving along the lever pin longitudinal axis A (i.e., preventing the lever pin 120 from falling out of the pocket recess 116). If the lever pin 120 starts to rotate about-, or move along, the lever pin longitudinal axis A (e.g., if the tool holder 100 is turned upside down), the guiding prong 134 limits the movement of the lever pin 120 by stopping against the walls of the blind hole 126.

Figure 4:
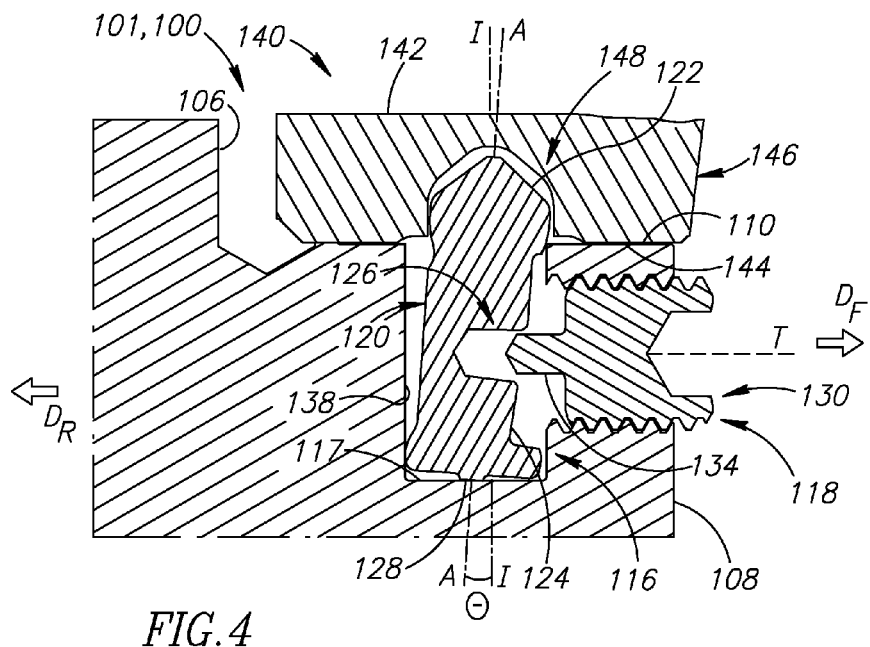
FIG. 4 is a cross section view of the cutting tool of FIG. 1, in a released position.

With further reference to FIG. 4, when the tool holder 100 is in the released position, and the cutting insert 140 is located on the insert pocket support surface 110, the lever pin 120 tilts forward, such that the lever pin longitudinal axis A forms a tilt angle θ with the longitudinal central bore axis I.

Drawing particular reference to FIG. 9, there is depicted a view of the insert pocket 102, perpendicular to the support surface 110, when the tool holder 100 is in the released position. The head portion 122 of the lever pin 120 is shown to be tilted forward, towards the insert pocket front surface 108. The pocket recess 116 has a substantially oval cross section 136, while the lever pin 120 has a substantially circular shaped cross section 123 (shown also in FIG. 7). The oval shape of the pocket recess 116 allows for the lever pin 120 to tilt, thereby allowing the head portion 122 to move rearward and forward within the pocket recess 116. Alternatively, the lever pin 120 may have an oval cross section, with smaller dimensions than the oval cross section 136 of the pocket recess 116, which would still allow relative movement of the lever pin 120 within the pocket recess 116.

Although the present invention has been described to a certain degree of particularity, it should be understood that various alterations and modifications could be made without departing from the spirit or scope of the invention as hereinafter claimed.

What is claimed is:

1. A tool holder (100) comprising:
    an insert pocket (102) comprising:
        an insert pocket front surface (108), an insert pocket rear portion (106), and an insert pocket support surface (110) extending therebetween;
        an insert pocket top surface (114), with at least one support wall (112) extending between the insert pocket support surface (110) and the insert pocket top surface (114);
        a pocket recess (116) opening out to, and extending downwards from the insert pocket support surface (110); and
        a threaded recess (118) opening out to the insert pocket front surface (108) and to the pocket recess (116), the threaded recess (118) having a threaded recess axis (T);
    a lever pin (120) having a top end (125a), a bottom end (125b) and a lever pin longitudinal axis (A), and located within the pocket recess (116), the lever pin (120) comprising:
        a head portion (122), having thereon a lever head rear contact surface (C), located above the insert pocket support surface (110);
        a lever front surface (124), extending downwards from the head portion (122), at least a portion of the lever front surface (124) sloping in a slope angle (δ) relative to the lever pin longitudinal axis (A), the lever front surface (124) having thereon a lever front contact surface (H), located downwards from the lever head rear contact surface (C) by a first longitudinal distance (h1);
        a blind hole (126) opening out to, and extending from, the lever front surface (124) towards the lever pin longitudinal axis (A), the blind hole (126) located along the threaded recess axis (T);
        a base portion (121) provided with a rocker pivot portion (128) to enable tilting of the lever pin (120) about the rocker pivot portion (128), in the forward-rearward directions ($D_F$, $D_R$); and
        a lever lower rear contact surface (G), located downwards from the lever front contact surface (H) by a second longitudinal distance (h2); and
    a fastening member (130) comprising a first end (131) having thereon a clamping contact surface (B), a second end (133), a threading surface (132) extending between the first and second ends (131, 133), and a guiding prong (134) extending from the first end (131), the threading surface (132) engages the threaded recess (118), the guiding prong (134) is located within the blind hole (126), and the clamping contact surface (B) is adjacent to the lever front contact surface (H);
    wherein in a side view of the lever pin (120), the first longitudinal distance (h1) is smaller than the second longitudinal distance (h2).

2. The tool holder (100) according to claim 1, wherein the pocket recess (116) has an oval-shape cross section (136).

3. The tool holder (100) according to claim 1, wherein at least a portion of each of the at least one support wall (112) forms a pocket dovetail angle (β) with the insert pocket support surface (110).

4. The tool holder (100) according to claim 1, wherein the insert pocket (102) comprises two support walls (112), converging rearwards in a support wall convergence angle (γ), in a view taken perpendicular to the support surface (110).

5. The tool holder (100) according to claim 1, wherein locating the guiding prong (134) within the blind hole (126) prevents the lever pin (120) from rotating about, and from moving along, the lever pin longitudinal axis (A).

6. The tool holder (100) according to claim 1, wherein the pocket recess (116) extends parallel to the insert pocket front surface (108).

7. A cutting tool (101) comprising the tool holder (100) according to claim 1, and a cutting insert (140), located in the insert pocket (102) of the tool holder (100), the cutting insert (140) comprising a first surface (142), a second surface (144), a peripheral surface (146) extending there between, and an insert bore (148) opening out to at least the second surface (144), the insert bore (148) having a longitudinal central bore axis (I) perpendicular to the first and second surfaces (142, 144), the peripheral surface (146) having at least one side abutment surface (150) forming an insert dovetail angle (α) with the second surface (144).

8. The cutting tool (101) according to claim 7, wherein the pocket recess (116) has a pocket recess contact surface (J) on a rear wall (138) thereof, and the insert bore (148) has an insert bore rear contact surface (K), the insert dovetail angle (α) conforms to the pocket dovetail angle (β), and
wherein in a fastened position of the cutting tool (101):
the second surface (144) abuts the insert pocket support surface (110);
the head portion (122) is located within the insert bore (148), such that the lever head rear contact surface (C) presses against the insert bore rear contact surface (K);
the clamping contact surface (B) of the fastening member (130) presses against the lever front contact surface (H);
the lever lower rear contact surface (G) presses against the pocket recess contact surface (J);
each side abutment surface (150) is pressed against an associated support wall (112), in a dovetail manner; and
a third longitudinal distance (h3) between the insert bore contact surface (K) and the second surface (144) is smaller than a fourth longitudinal distance (h4) between the insert bore rear contact surface (K) and the first surface (142).

9. The cutting tool (101) according to claim 8, wherein the fastening member (130) applies a first lateral rearward force ($F_{B,H}$) on the lever pin (120) at the lever front contact surface (H).

10. The cutting tool (101) according to claim 8, wherein the lever pin (120) applies a second lateral rearward force ($F_{C,K}$) on the cutting insert (140) at the insert bore rear contact surface (K).

11. The cutting tool (101) according to claim 8, wherein the lever pin (120) applies a third lateral rearward force ($F_{G,J}$) on the pocket recess (116) at the pocket recess contact surface (J).

12. The cutting tool (101) according to claim 8, wherein in the fastened position, the lever pin longitudinal axis (A) substantially coincides with the longitudinal central bore axis (I).

13. The cutting tool (101) according to claim 8, wherein in a released position, when the cutting insert (140) is located on the insert pocket support surface (110), the lever pin longitudinal axis (A) forms a tilt angle (θ), with the longitudinal central bore axis (I).

14. The cutting tool (101) according to claim 8, wherein each support wall (112) applies a normal force ($F_N$) on the associated side abutment surface (150), the normal force ($F_N$) being perpendicular to the associated side abutment surface (150) and having a downward force component (F) with a magnitude of: $F_N \cos \alpha$.

15. The cutting tool (101) according to claim 7, wherein the insert bore (148) is a blind bore opening out only to the second surface (144).

16. The cutting tool (101) according to claim 7, wherein the insert bore (148) is a through bore opening out to the first surface (142) and to the second surface (144).

17. The cutting tool (101) according to claim 7, wherein the cutting insert (140) comprises two side abutment surfaces (150), converging rearwards in an insert rearward convergence angle (ϕ), in a view taken perpendicular to the first surface (142).

18. The cutting tool (101) according to claim 17, wherein the insert rearward convergence angle (ϕ) conforms to the support wall rearward convergence angle (γ).

* * * * *